T. B. BARNES.
SPRAYER.
APPLICATION FILED SEPT. 9, 1909.
963,979.
Patented July 12, 1910.
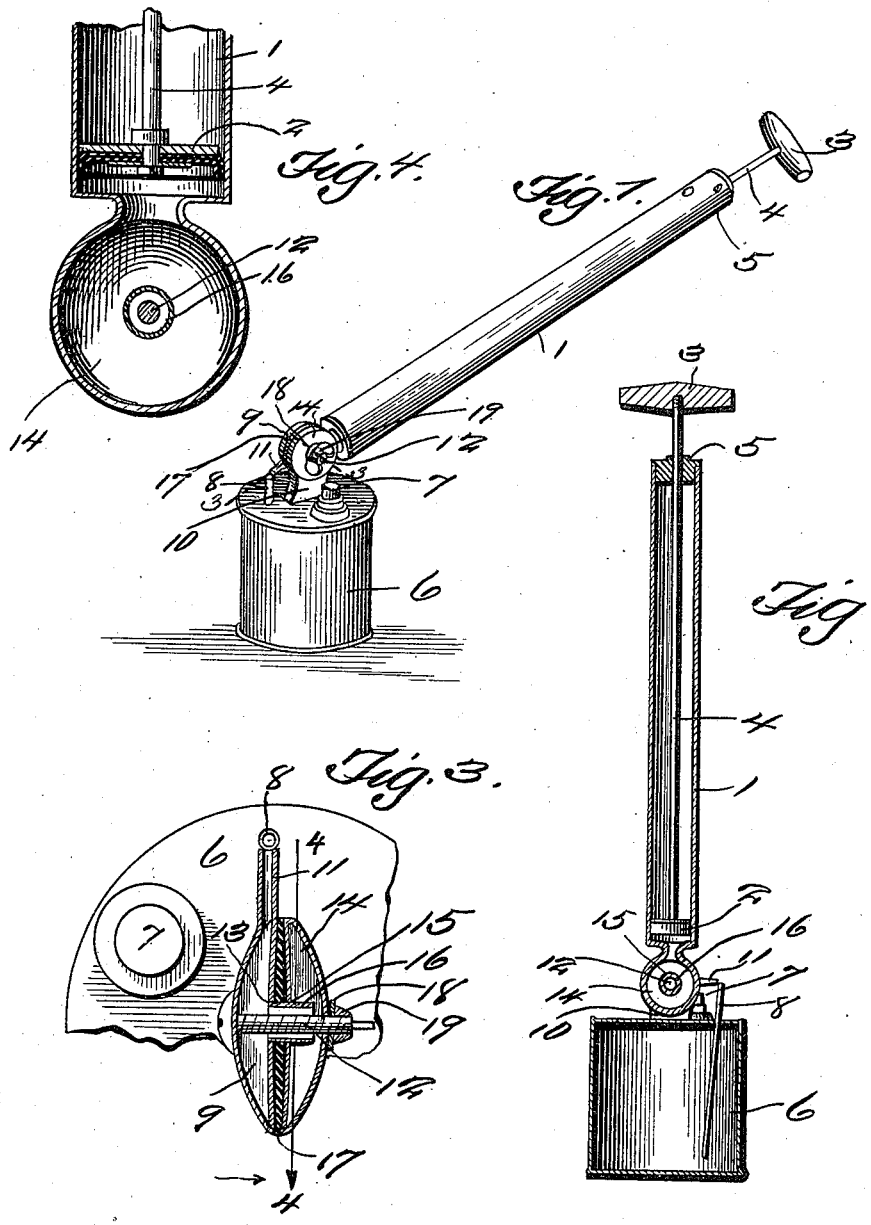
Witnesses
A. M. Whitmore.
N. L. Whitmore.
Inventor
Thomas B. Barnes,
By E. B. Whitmore,
Attorney
THE NORRIS PETERS CO., WASHINGTON, D. C.

UNITED STATES PATENT OFFICE.

THOMAS B. BARNES, OF NEWARK, NEW YORK.

SPRAYER.

963,979.  Specification of Letters Patent.  Patented July 12, 1910.

Application filed September 9, 1909.  Serial No. 516,983.

*To all whom it may concern:*

Be it known that I, THOMAS B. BARNES, of Newark, in the county of Wayne and State of New York, have invented a new and useful Improvement in Sprayers, which improvement is fully set forth in the following specification and shown in the accompanying drawings.

This invention relates to certain new and useful improvements in sprayers of that class designed for use in spraying plants and the like, and embodying a cylinder, a piston movable therein, and a receptacle for holding the liquid and means for causing the liquid to be ejected in the form of a spray.

In this class of devices as generally constructed it is not easy to get at the very parts where the worms and insects are generally secreted, namely, under the leaves. I have discovered that the destructive worms and insects and the like are mostly or commonly found on the under surfaces of the leaves of the plants or shrubs, and where the shrubs are low, with the limbs and leaves near the ground, it is difficult with the ordinary sprayer to force the liquid directly against the under surfaces of the leaves or the low-down places where it is most desirable that it should get.

The primary object of the present invention is to provide a sprayer of this general character whereby the spray may be thrown upwardly directly against such low-down places and against the under surfaces of the leaves of the plants and shrubs. I connect the liquid-holding vessel with the cylinder by a pivotal joint so constructed that by turning the tubular handle on its axis so that the handle will be practically parallel with the axis of the said vessel the vessel may be projected under the leaves and so serve to throw the liquid or spray directly upward. The vessel may be conveniently passed beneath the leaves and low-down branches near the ground so that the jet of spray may be thrown upward or at any angle desired.

The pivotal connection between the liquid-holding vessel and the cylinder is such that the air tight connection is maintained during all of the movements of the vessel.

I aim also at improvements in the details of construction whereby a cheaply constructed and efficient sprayer is produced and one that is not liable to get out of order notwithstanding the various positions which it may be called upon to assume.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which—

Figure 1 is a perspective view of a sprayer constructed in accordance with my invention. Fig. 2 is a substantially central longitudinal section through the same. Fig. 3 is an enlarged sectional detail, taken on the line 3—3 of Fig. 1, with a portion of the top of the liquid-holding vessel shown in plan view. Fig. 4 is a view, on an enlarged scale, as on the line 4—4 of Fig. 3 with the piston in longitudinal section, and one of the members of the pivotal connection also in section.

Like numerals of reference indicate like parts throughout the several views.

Referring to the drawings 1 designates the tubular handle, which constitutes the cylinder within which works the plunger or piston 2 carried by the rod 4 provided with a suitable handle 3 and working through an opening in the end 5 of the cylinder. These parts may be of any of the usual or well known forms of construction and operating in the usual way.

6 is the vessel or receptacle for containing the liquid; this also is of the usual form, being provided with the usual filling opening closed by a screw cap or other closure 7, and the usual discharge nozzle 8.

The novelty in the present instance resides in the connection between the vessel 6 and the adjacent end of the cylinder or tubular handle. This is constructed as follows;— 9 is a substantially flat hollow member carried by a plate 10 rising from the top of the vessel 6 and projecting therefrom and communicating with the interior thereof is the lateral tubular member or nozzle 11 which is arranged in the usual position with relation to the discharge end of the tube or nozzle 8 for the usual purpose, as will be readily understood. Projecting laterally from this member 9 is the screw 12 the head of which is fixedly held in the said member as seen clearly in Fig. 3, the said screw projecting through an axial opening 13 in the member 9 as will also be clearly seen in Fig. 3.

Projecting from the end of the cylinder or tubular handle adjacent the vessel 6 is a hollow flat member 14 which is rigid with the tubular handle and which communicates with the interior thereof as shown. Projecting centrally from about an axial opening 15 in this flat hollow member 14 is a short tube or sleeve 16 which projects into the opening 13 of the other flat member 9 as seen in Fig. 3 so as to provide communication between the two members and thereby between the cylinder and the vessel.

17 is a felt or other washer between the adjacent flat faces of the two members 9 and 14 to insure a tight joint.

18 is a washer on the screw 12 which screw projects through a central opening in the outer face of the member 14 and of course through the centrally disposed tube or sleeve 16, and upon its outer end receives a nut 19. This forms a pivotal connection between the tubular handle and the vessel and permits of the necessary movements of the vessel relatively to the handle so that the spray may be thrown upon the under sides of the leaves or in any other desired direction.

The vessel may be arranged so as to turn with greater or less freedom of movement by loosening or tightening the nut 19.

Modifications in detail may be resorted to without departing from the spirit of the invention or sacrificing any of its advantages.

What is claimed as new is:—

1. A sprayer comprising a vessel, a tubular handle pivotally mounted at one end on the top of said vessel, and oppositely disposed hollow members, one of which has a lateral nozzle and through which members the pivot of the handle passes, one of said members having an axial tubular portion through which the pivot of the handle passes.

2. A sprayer comprising a vessel, a tubular handle pivotally mounted at one end on the top of said vessel, oppositely disposed hollow members, one of which has a lateral nozzle and through which members the pivot of the handle passes, one of said members having an axial tubular portion through which the pivot of the handle passes, and a washer between adjacent faces of said members and embracing said tubular portion.

3. In a sprayer, a vessel having a plate rising therefrom, a hollow member carried by said plate, a lateral tubular member projecting from said hollow member, a screw projecting from said hollow member, a tubular handle, a hollow member carried thereby and having an axial opening, a hollow sleeve projecting therefrom into an axial opening in the first-named member, said screw projecting through said sleeve, and a nut on the outer end of said screw, said screw serving as a pivot on which the handle turns.

4. A sprayer comprising a vessel, a tubular handle pivotally mounted at one end on the top of said vessel, oppositely disposed hollow members, one of which has a lateral nozzle, said members being disposed with their flat faces adjacent with an interposed washer, one of said members having an axial tubular portion, and a pivot for the handle passed therethrough and through said hollow members.

In witness whereof, I have hereunto set my hand this 2d day of September, 1909, in the presence of two subscribing witnesses.

THOMAS B. BARNES.

Witnesses:
M. H. RICHMOND,
P. L. MESTLER.